(12) United States Patent
Suzuki

(10) Patent No.: US 8,065,973 B2
(45) Date of Patent: Nov. 29, 2011

(54) PANEL FOR INDICATING INSTRUMENT, METHOD OF MANUFACTURING THE PANEL, AND INDICATING INSTRUMENT HAVING THE PANEL

(75) Inventor: Ryo Suzuki, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 736 days.

(21) Appl. No.: 11/454,837

(22) Filed: Jun. 19, 2006

(65) Prior Publication Data

US 2006/0286352 A1   Dec. 21, 2006

(30) Foreign Application Priority Data

Jun. 21, 2005   (JP) ................................ 2005-181092
Oct. 13, 2005   (JP) ................................ 2005-299247

(51) Int. Cl.
  *B32B 3/00* (2006.01)
  *B32B 3/30* (2006.01)

(52) U.S. Cl. .......... 116/47; 116/46; 116/62.2; 116/62.3; 428/156; 428/167; 428/169

(58) Field of Classification Search ................... 116/286; 73/499; *G01D 13/02*
  See application file for complete search history.

(56) References Cited

U.S. PATENT DOCUMENTS

| | | | |
|---|---|---|---|
| 4,991,064 A | | 2/1991 | Clem |
| 5,261,349 A | * | 11/1993 | Iino et al. ...................... 116/289 |
| 5,353,735 A | * | 10/1994 | Arai et al. ...................... 116/286 |
| 5,855,717 A | | 1/1999 | Beer et al. |
| 6,218,004 B1 | | 4/2001 | Shaw et al. |
| 6,663,252 B1 | | 12/2003 | Fong et al. ...................... 362/29 |
| 6,802,276 B2 | | 10/2004 | Sugimoto |
| 6,904,866 B2 | * | 6/2005 | Furuya .......................... 116/286 |
| 7,332,210 B2 | | 2/2008 | Arms et al. |
| 2003/0189819 A1 | * | 10/2003 | Furuya ............................ 362/26 |
| 2004/0196516 A1 | * | 10/2004 | Petersen et al. ................. 359/15 |
| 2005/0018299 A1 | * | 1/2005 | Tokoyoda et al. ............ 359/576 |
| 2005/0219698 A1 | * | 10/2005 | Tanaka .......................... 359/558 |

FOREIGN PATENT DOCUMENTS

JP  08-021749  1/1996

OTHER PUBLICATIONS

"Principles of Instrumental Analysis," 5th ed., Harcourt Brace & Co., 1998, p. 159-160.*
Japanese Office Action dated Feb. 23, 2010, issued in corresponding Japanese Application No. 2005-299247, with English translation.
Official Action dated Aug. 24, 2010 issued in co-pending U.S. Appl. No. 12/379,148 of Suzuki, filed Feb. 13, 2009.
Office Action mailed Apr. 29, 2010 in U.S. Appl. No. 12/379,148.
Final Office Action dated Jan. 10, 2011, in U.S. Appl. No. 12/379,148.
Office Action dated May 6, 2011, issued in U.S. Appl. No. 12/379,148.

* cited by examiner

*Primary Examiner* — Alicia Chevalier
*Assistant Examiner* — Frank D Ducheneaux
(74) *Attorney, Agent, or Firm* — Nixon & Vanderhye PC

(57) ABSTRACT

A panel for an indicating instrument has a base plate. The base plate has a line pattern with lines. The line pattern is defined by projections and grooves. A desired metal-like appearance is converted into a glossiness ratio Gp/Gv. The projections and grooves are formed at intervals and have at least one dimension in a direction perpendicular to the surface such that the surface has a predetermined glossiness ratio Gp/Gv. Gp is a glossiness measured in a direction parallel to an axis of at least one line. Gv is a glossiness measured in a direction perpendicular to an axis of at least one line.

14 Claims, 8 Drawing Sheets

PANEL FOR INDICATING INSTRUMENT, METHOD OF MANUFACTURING THE PANEL, AND INDICATING INSTRUMENT HAVING THE PANEL

CROSS REFERENCE TO RELATED APPLICATION

This application is based on Japanese Patent Applications No. 2005-181092 filed on Jun. 21, 2005 and No. 2005-299247 filed on Oct. 13, 2005, the disclosures of which are incorporated herein by reference.

FIELD OF THE INVENTION

The present invention relates to a panel having an ornamental line pattern, a method of manufacturing the panel and an indicating instrument having the panel.

BACKGROUND OF THE INVENTION

It is known to form an ornamental line pattern on a resinous display panel of an indicating instrument such as by printing. For example, the line pattern forms a hair line figure having plural parallel lines or circles concentric with a rotation axis of a pointer of the indicating instrument. Alternatively, the line pattern is designed to radially extend from the rotation axis, like the rays of the sun.

This kind of ornamental line pattern is formed to improve an appearance of the resinous display panel. However, the appearance of the conventional resinous panel having such an ornamental line pattern is likely to be lower than an appearance of a metal panel.

Generally, appearance is based on a sense of human sight. Therefore, it is generally difficult to directly apply a quality appearance such as a metal-like appearance to design parameters for designing the line pattern. Also, there is no disclosure about design parameters for improving the metal-like appearance with the line pattern.

SUMMARY OF THE INVENTION

The present invention is made in view of the foregoing, and it is a first object of the present invention to provide a panel with an ornamental line pattern for an indicating instrument, which is capable of achieving a predetermined metal-like appearance.

It is another object of the present invention to provide a method of manufacturing the panel having the predetermined metal-like appearance.

It is further another object of the present invention to provide an indicating instrument having the panel.

It is still another object of the present invention to provide a panel with an ornamental line pattern for an indicating instrument, which has light transmissivity, but capable of reducing uneven brightness on the panel.

According to a panel for an indicating instrument, a surface of a base plate has a line pattern with lines. The line pattern is defined by projections and grooves that are defined between adjacent projections. The projections and grooves are formed such that the surface of the panel has a predetermined glossiness ratio Gp/Gv. Gp is a glossiness measured in a direction parallel to an axis of the at least one line. Gv is a glossiness measured in a direction perpendicular to the axis of the at least one line.

A metal-like appearance, which is generally based on a sense of sight, can be converted into the glossiness ratio Gp/Gv. Further, the glossiness ratio Gp/Gv is applied to parameters for designing the projections and grooves. Namely, the projections and grooves are formed such that the surface has a desired metal-like appearance. Accordingly, appearance of the panel improves. This panel is, for example, employed as a display panel in an indicating instrument.

In a case that the projections and grooves are made of a material that allows light to pass therethrough, at least one of the intervals of the projections and grooves and dimensions of the grooves and projections in a direction perpendicular to the surface is randomly varied. Accordingly, uneven brightness of the surface is reduced by a prism effect of the projections and grooves.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

A first example embodiment of a panel of the present invention will be described with reference to FIGS. 1 to 7. The panel of the present invention is for example employed as a dial board 2 of a vehicle combination meter 1.

Figure 1:
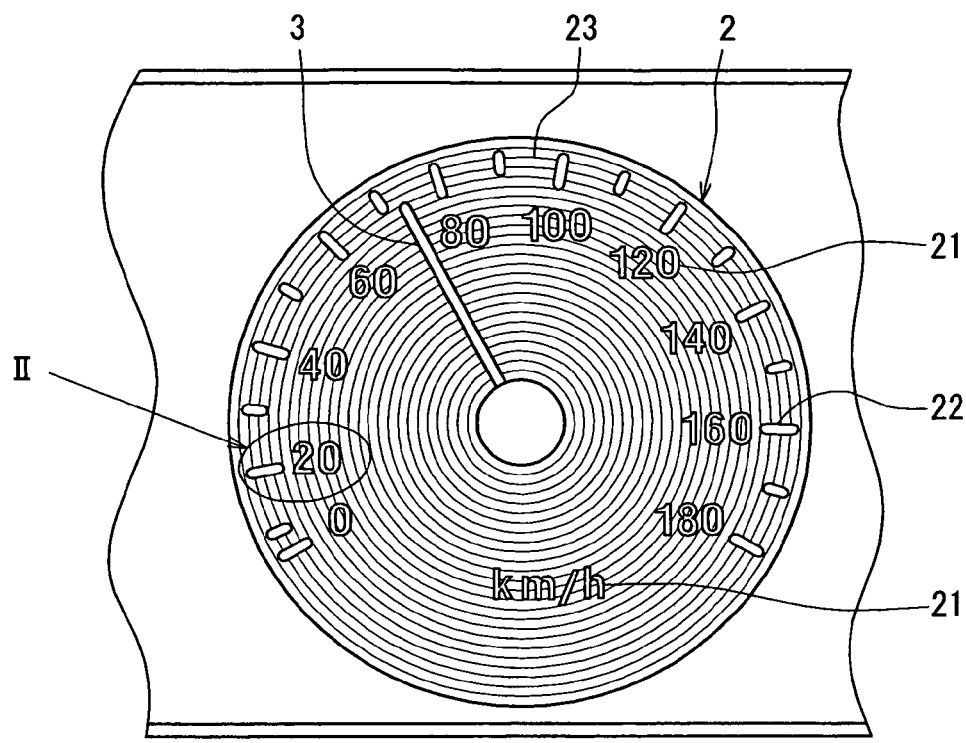
FIG. 1 is a plan view of a dial board of a combination meter according to a first example embodiment of the present invention.
Figure 2:
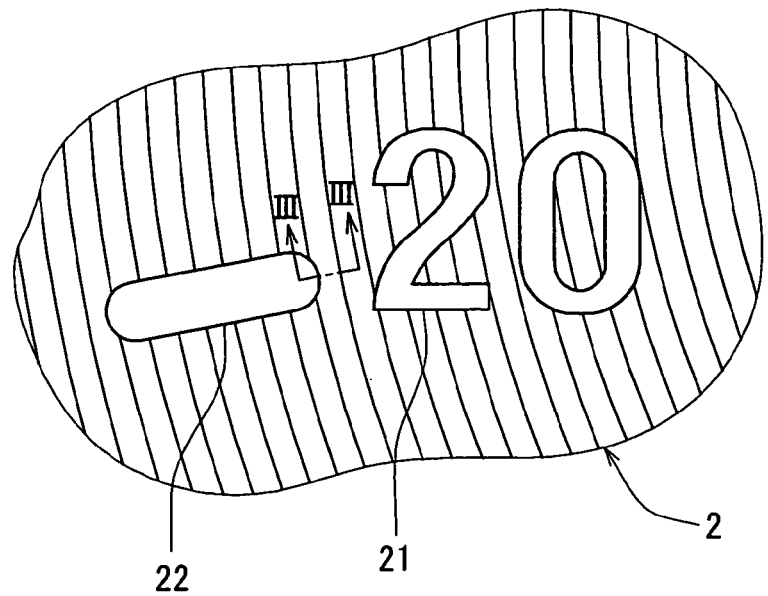
FIG. 2 is an enlarged view of a part of the dial board denoted by an arrow II in FIG. 1.

The combination meter 1 is generally arranged in front of a driver's seat as an indicating instrument for indicating various information relating to a vehicle. The dial board 2 shown in FIG. 1 is for example provided as a speed meter for indicating a speed of the vehicle. In the speed meter shown in FIG. 1, a pointer 3 is operated to rotate along a front surface of the dial board 2, so a driver can easily see the speed of the vehicle.

The dial board 2 is provided with letters/numbers 21 and scales 22 for indicating the speed with the pointer 3. Further, the dial board 2 has an ornamental line pattern 23 with lines. The line pattern is formed to improve an appearance, i.e., to provide a quality metal-like appearance. The metal-like appearance generally provides a quality image and a sporty image. In the example embodiment shown in FIG. 1, the ornamental line pattern 23 is designed in circles concentric with a rotation axis of the pointer 3.

The dial board 2 has a base plate 20 made of resin such as a polycarbonate. The lines of the ornamental line pattern 23 are provided by projections and grooves formed on a surface of the base plate 20, which faces a driver. The letters/numbers 21 and the scales 22 are formed on the surface of the base plate 20 such as by printing or hot-stamping.

Figure 3:
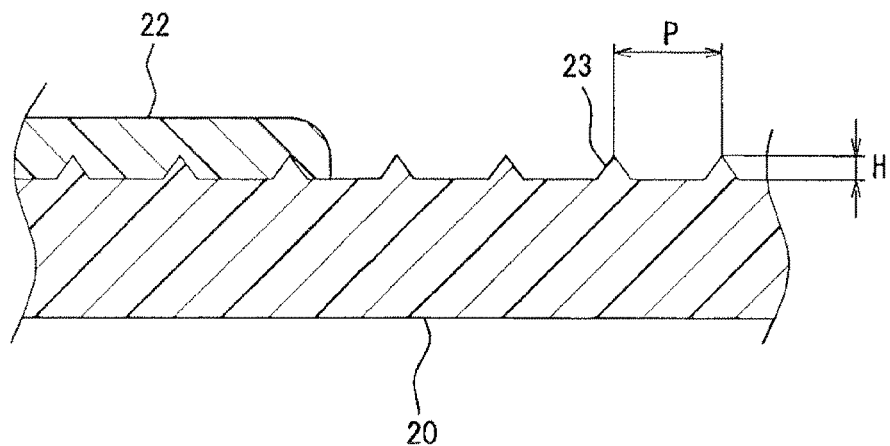
FIG. 3 is a cross-sectional view of the dial board taken along a line III-III in FIG. 2.

In the first example embodiment, the ornamental line pattern 23 is formed by projections projecting from the surface of the base plate 20. In a cross sectional plane defined perpendicular to an axis of at least one line, each of the projections has a general triangular cross-section, as shown in FIG. 3. The adjacent projections extend side by side. When molding the base plate 20, a precision die having grooves is used. Thus, projections are formed at positions corresponding to the grooves of the die. Accordingly, the ornamental line pattern 23 is formed by being transferred to the base plate from the die.

The cross-sectional shape of the projections is not limited to the general triangular shape shown in FIG. 3. The projection can have a general semi-circular cross-sectional shape or a general rectangular cross-sectional shape, instead of the general triangular cross-sectional shape. Further, the ornamental line pattern 23 can be formed by grooves recessed from the surface of the base plate 20, instead of or together with the projections.

Also, the ornamental line pattern 23 can be formed by methods other than transference from a die. For example, the ornamental line pattern 23 can be printed by using a printing plate that can form projections and grooves (screen print). Alternatively, the ornamental line pattern 23 can be formed by hot-stamping using a transferring film and a precision die for thermally transferring the line pattern from the transferring film. Furthermore, the ornamental line pattern 23 can be formed by laminating, i.e., by adhering a film having the line pattern (thermo compression bonding).

Figure 13:
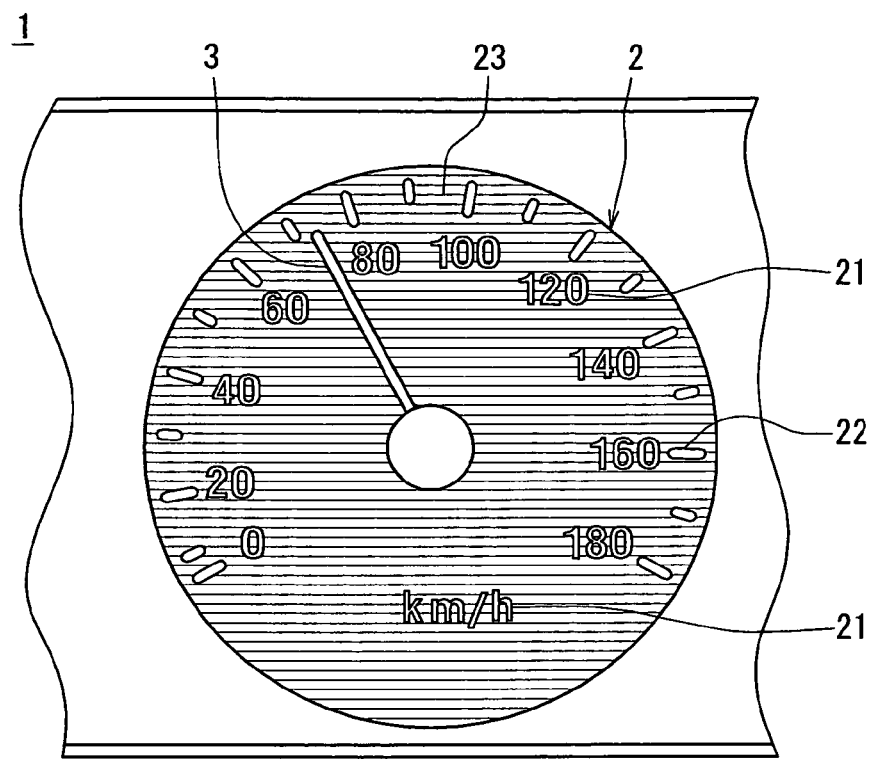
FIG. 13 is a plan view of a dial board having a hair line pattern according to another modification of the present invention.
Figure 14:
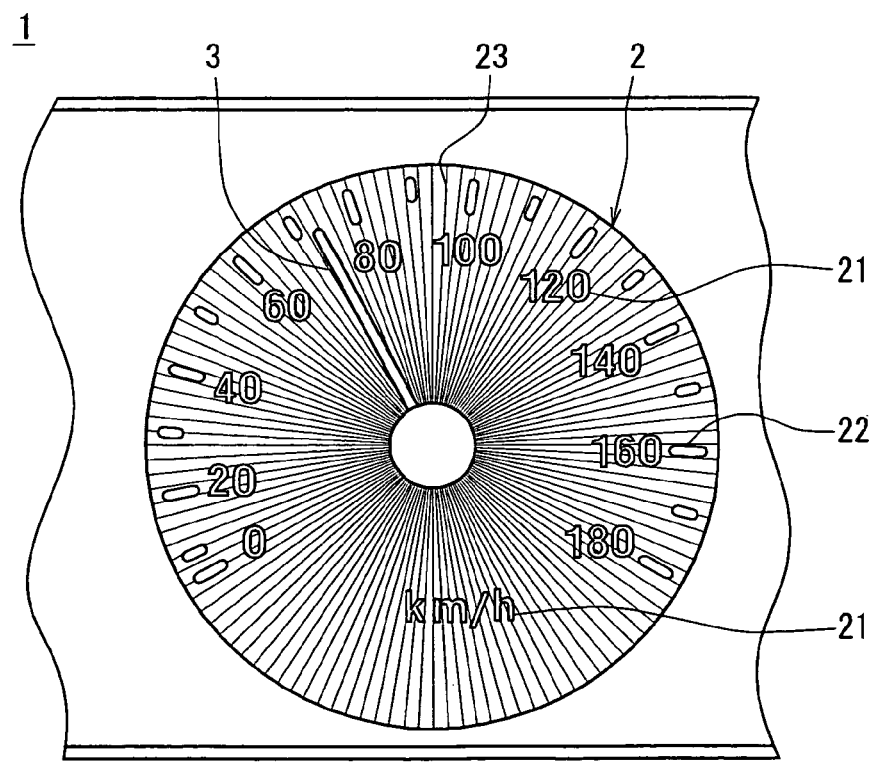
FIG. 14 is a plan view of a dial board having a radial line pattern as rays of the sun according to further another modification of the present invention.

The ornamental line pattern 23 is not limited to the concentric circle design shown in FIG. 1. The ornamental line pattern 23 can be formed as a hair-line design having parallel lines, as shown in FIG. 13. Alternatively, the ornamental line pattern 23 can be formed to radially extend from the rotation axis of the pointer 3 like the rays of the sun, as shown in FIG. 14.

As described above, the ornamental line pattern 23 is formed so as to provide a metal-like appearance on the dial board 2. However, an appearance of a surface or object is generally based on a sense of human sight. Thus, it is difficult to directly apply the appearance to parameters for designing the line pattern. As such, a metal-like appearance, i.e., an appearance of a desired metal surface is first converted into numbers. Then, the numbers corresponding to the metal-like appearance is applied to parameters in designing the ornamental line pattern 23 so that the surface of the base plate 20 has such a metal-like appearance.

For example, the metal-like appearance is converted into a ratio of a glossiness Gp to a glossiness Gv. Here, the glossiness Gv is measured in a direction perpendicular to an axis of the at least one line of the line pattern 23. The glossiness Gp is measured in a direction parallel to the axis of the at least one line.

Figure 4A:
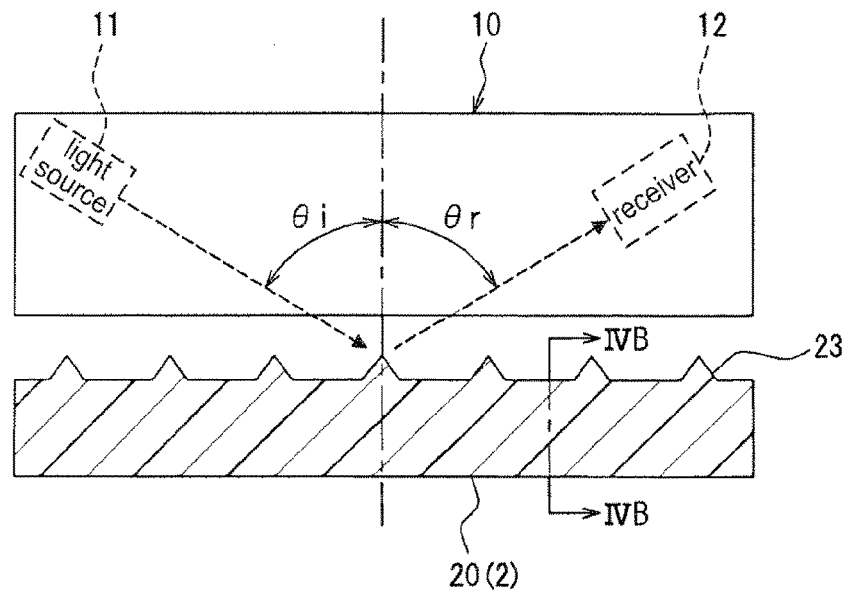
FIG. 4A is a schematic sectional view of a base plate of the dial board, taken in a direction perpendicular to an axis of at least one projection formed on the base plate, for showing an examination procedure for measuring a glossiness Gv of a surface of the base plate in a direction perpendicular to the axis of the projection.
Figure 4B:
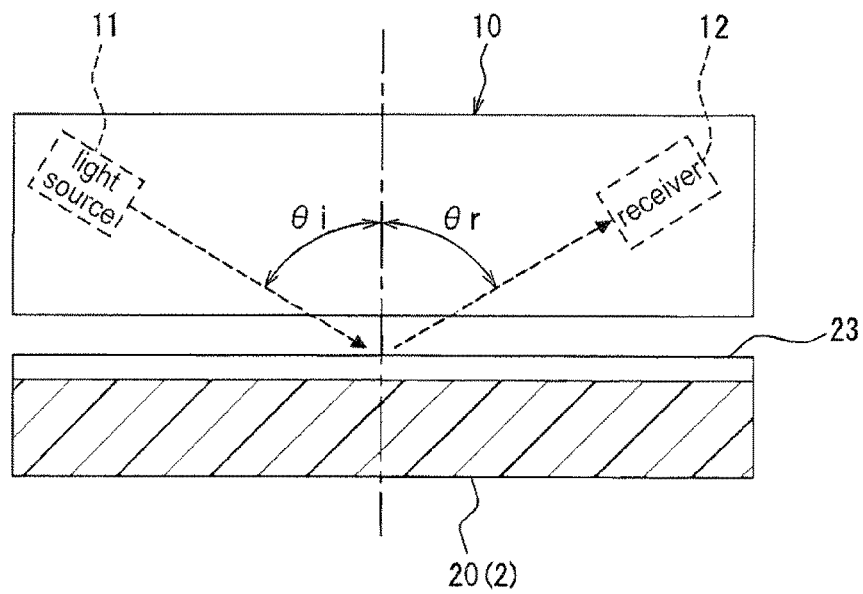
FIG. 4B is a schematic sectional view of the base plate, taken along a line IVB-IVB of FIG. 4A, for showing an examination procedure for measuring a glossiness Gp of the surface of the base plate in a direction parallel to an axis of at least one projection.

As shown in FIGS. 4A and 4B, the glossiness Gv and the glossiness Gp are measured by using a gloss meter 10 having a light source 11 and a receiver 12. Here, a gloss or brightness is a property of light that makes regular reflection on a surface, and the glossiness is defined by a degree of gloss or brilliancy.

The glossiness Gv and the glossiness Gp are calculated from a reflectance of the light emitted from the light source 11 on the base plate 20. The light emitted from the light source 11 is incident on the base plate 20 with an incidence angle $\theta i$ and reflects with a reflection angle $\theta r$. The receiver 12 receives the reflected light and determines the reflectance of the light. Here, the incidence angle $\theta i$ and the reflection angle $\theta r$ are 60°, respectively.

FIG. 4A shows a condition for measuring the glossiness Gv. A plane of FIG. 4A is parallel to a cross sectional plane that is defined perpendicular to the axis of at least one line. FIG. 4B shows a condition for measuring the glossiness Gp. A plane of FIG. 4B is perpendicular to the cross sectional plane.

The glossiness is provided in the Japanese Industrial Standards (JIS). When the incidence angle $\theta i$ and the reflection angle $\theta r$ are 60° on a glass surface having a refractive index of 1.567, 10% reflectance is defined as 100% glossiness. Further, when the incidence angle $\theta i$ and the reflection angle $\theta r$ are 20° on the glass surface, 5% reflectance is defined as 100% glossiness.

Generally, when a surface to be measured has a relatively high brightness, the glossiness is measured with a relatively small incidence angle $\theta i$ and a relatively small reflection angle $\theta r$. On the contrary, when a surface to be measured has a relatively low brightness, the glossiness is measured with a relatively large incidence angle $\theta i$ and a relatively larger reflection angle $\theta r$. The JIS describes a measuring angle as 20°, 45°, 60°, 75°, and 85°. A gloss meter that has the measuring angle of 60° is widely used. Also, a gloss meter that has the measuring angle of 20° is used to measure a glossiness of a relatively bright surface.

Figure 5:
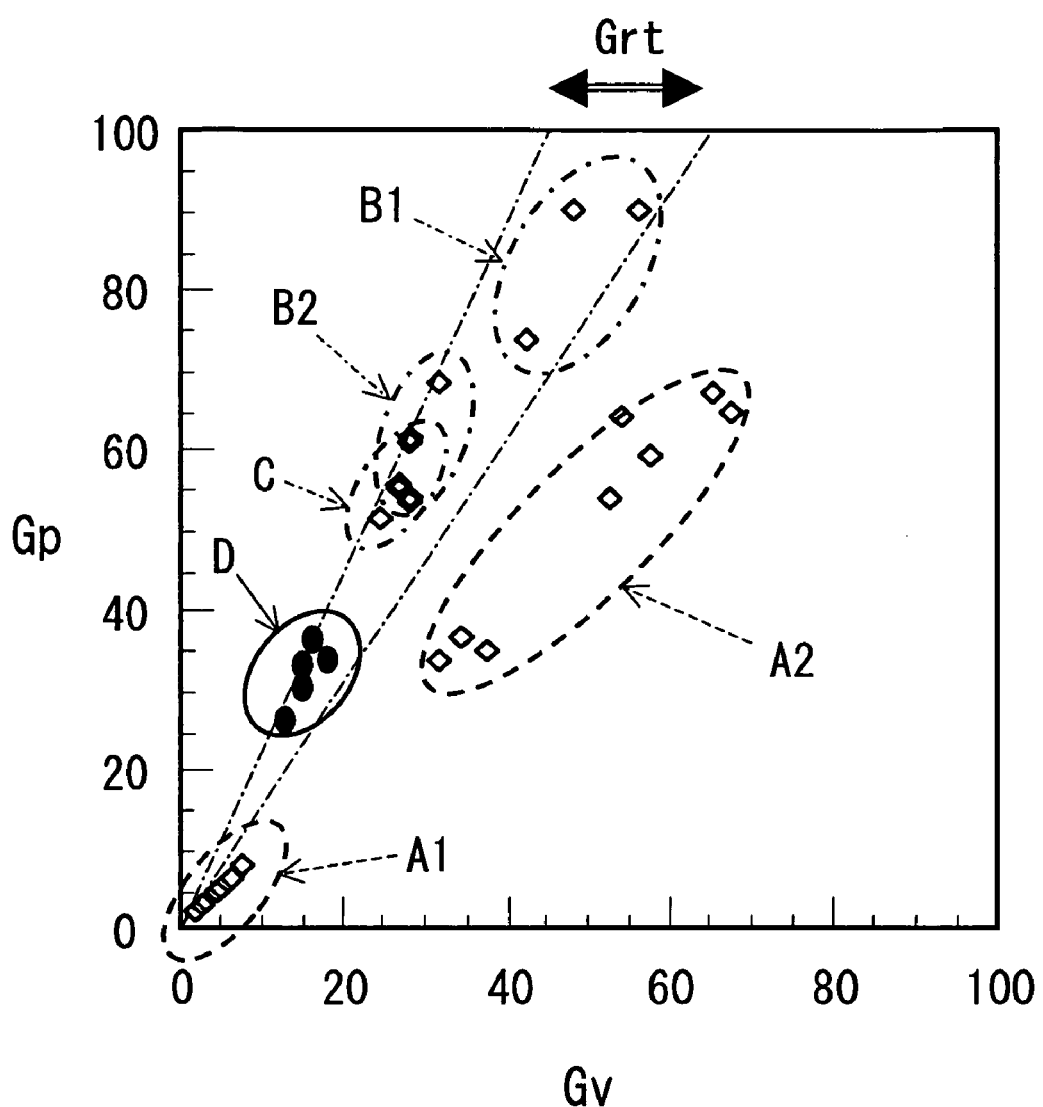
FIG. 5 is a graph showing a relationship between the glossiness Gv and the glossiness Gp according to the examination shown in FIGS. 4A and 4B.

In the first example embodiment, the glossiness Gv and the glossiness Gp of surfaces of various test subjects are measured by using a gloss meter having the measuring angle of 60° (e.g., using a gloss meter such as the GLOSS CHECKER IG-320, available from HORIBA Ltd.). A graph of FIG. 5 shows measuring results. In FIG. 5, a horizontal axis represents the glossiness Gv and a vertical axis represents the glossiness Gp.

In FIG. 5, a group A1 represents results of a frosted resin base plate (dial board) without having a line pattern defined by grooves and projections. A group A2 represents results of a general resin base plate (dial board) having a conventional line pattern defined by grooves and projections. A group B1 represents results of an aluminum base plate (dial board) in which a line pattern defined by grooves and projections are formed in concentric circles. The aluminum base plate is processed by alumite, that is, has an anodic oxide coating.

Also, a group B2 represents results of an aluminum base plate (dial board) in which a line pattern defined by grooves and projections are formed in a hair line design. The aluminum base plate of the group B2 also has an anodic oxide coating. A group C represents results of a surface of an optical disc. On the surface of the optical disc, grooves for storing information are formed.

Further, the glossiness ratio Gp/Gv of the above measured objects is defined by a gradient of the graph. The glossiness ratio Gp/Gv of the groups B1 and B2 is in a range (Grt) between 1.5 and 2.2. The glossiness ratio Gp/Gv of the groups A1 and A2 is in a range between 0.9 and 1.2. The latter ratio is largely different from the former ratio. Also, the glossiness ratio Gp/Gv of the group C is in a range between 1.9 and 2.2, and is similar to that of the groups B1 and B2.

The aluminum base plates of the group B1 and B2 naturally have a metallic appearance. Also, the optical disc has a metal-like appearance. However, the appearance of the base plate of the groups A1 and A2 is lower than the appearance of the metal base plates of the groups B1 and B2. As such, the glossiness ratio Gp/Gv can be used as an indicator of a metal-like appearance. The glossiness ratio Gp/Gv is used for designing the ornamental line pattern 23 so that the surface has a desired metal-like appearance. In the first example embodiment, it is preferable that the base plate 20 has the glossiness ratio Gp/Gv in a range between 1.5 and 2.2.

In this way, various parameters for designing the ornamental line pattern 23 are found through the experiments. The glossiness ratio Gp/Gv in the predetermined range between 1.5 and 2.2 provides a quality metal-like appearance. Accordingly, it is possible to provide a desired metal-like appearance in the base plate 20.

For example, an interval (pitch) P between adjacent ornamental line pattern 23 projections is set in a range between 0.1 mm to 0.3 mm, as shown in FIG. 3. Also, a height H of the projections in a direction perpendicular to the surface is set in a range between 10 μm and 20 μm. Here, the interval P is a distance between the tops of adjacent two projections. The height H is a dimension measured from the top of the projection and the bottom of the groove in a direction perpendicular to the surface of the base plate 20.

The glossiness Gv and the glossiness Gp of this base plate 20 are shown by a group D in FIG. 5. In the dial board 2, it is preferable that the glossiness Gv and the glossiness Gp are equal to or lower than 40 so as to reduce glare.

In the combination meter 1, a device (e.g., motor) 4 for rotating a pointer shaft of the pointer 3 and a control device 5 are provided on a rear side of the dial board 2. The rotation device 4 is operated to rotate the pointer shaft for an angle corresponding to an electric signal from an external device, e.g., a signal relative to a vehicle speed.

The pointer shaft is disposed to pass through a through hole formed at a center of the dial board 2. The pointer 3 is rotatably supported at an end of the pointer shaft.

Figure 6:
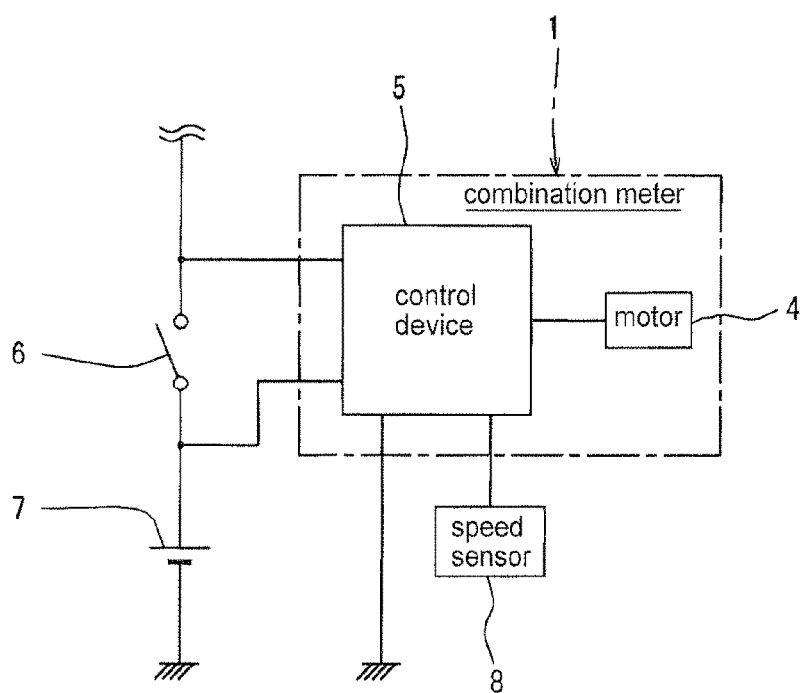
FIG. 6 is a schematic circuit diagram of the combination meter according to the first example embodiment of the present invention.

An electric circuit structure of the combination meter 1 will be described with reference to FIG. 6. The control device 5 is constructed of a microcomputer and other devices. The control device 5 is normally supplied with electric power from a battery 7. An ignition switch 6 is connected to the control device 5 in a manner that its operation condition such as on/off positions can be detected. Also, a speed sensor 8 for detecting a speed of the vehicle is connected to the control device 5 in a manner that a detection signal is inputted to the control device 5. Further, the device 4 is connected to the control device 5.

When the ignition switch 7 is turned on, the control device 5 detects the position of the ignition switch 7 and starts operation. The control device 5 calculates the speed of the vehicle based on the output signal from the speed sensor 8 and drives the moving device 4 so that the pointer shaft rotates an angle according to the speed of the vehicle to indicate the speed of the vehicle with the pointer 3.

As described in the above, the metal-like appearance is converted into the glossiness ratio Gp/Gv, and the ornamental line pattern 23 is formed such that the surface has a predetermined glossiness ratio Gp/Gv. Namely, the interval P and height of the projections and grooves on the front surface of the base plate 20 are arranged such that the glossiness ratio Gp/Gv of the surface is in the predetermined range (e.g., 1.5 to 2.2). Accordingly, the base plate 20 has a desired metal-like appearance.

In the first example embodiment shown in FIG. 3, the ornamental line pattern 23 is defined by the projections on the front surface of the base plate 20. The grooves, which are defined between the projections, have flat bottom walls. However, the ornamental line pattern 23 can be modified as shown in FIG. 7.

Figure 7:
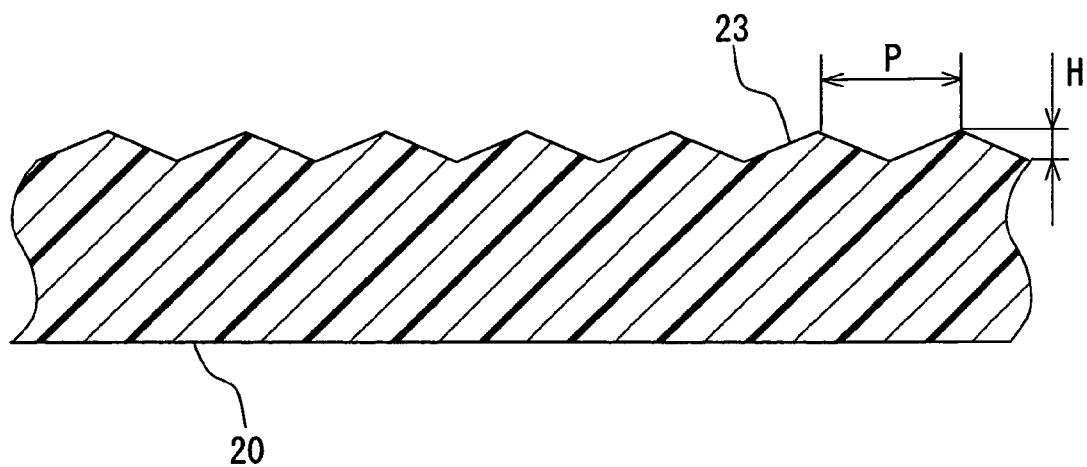
FIG. 7 is an enlarged partial cross-sectional view of the base plate as a modification of the first example embodiment shown in FIG. 3.

In FIG. 7, the ornamental line pattern 23 is also defined by projections and grooves. However, the grooves do not have flat bottom walls. Instead, the grooves have a general V-shaped cross section. The ornamental line pattern 23 is defined by sloped walls with respect to a plane of the base plate 20. Accordingly, the metal-like appearance further improves.

A second example embodiment of the present invention will be described hereafter with reference to FIGS. 8 to 11

In the second example embodiment, the ornamental line pattern 23 has light transmissivity, i.e., allows light to pass therethrough. For example, the base plate 20 is made of a resin that allows light to pass through, such as polycarbonate so that a whole of the base plate 20 has light transmissivity. Alternatively, the base plate 20 can be formed such that only the projections and grooves have light transmissivity.

Figure 8:
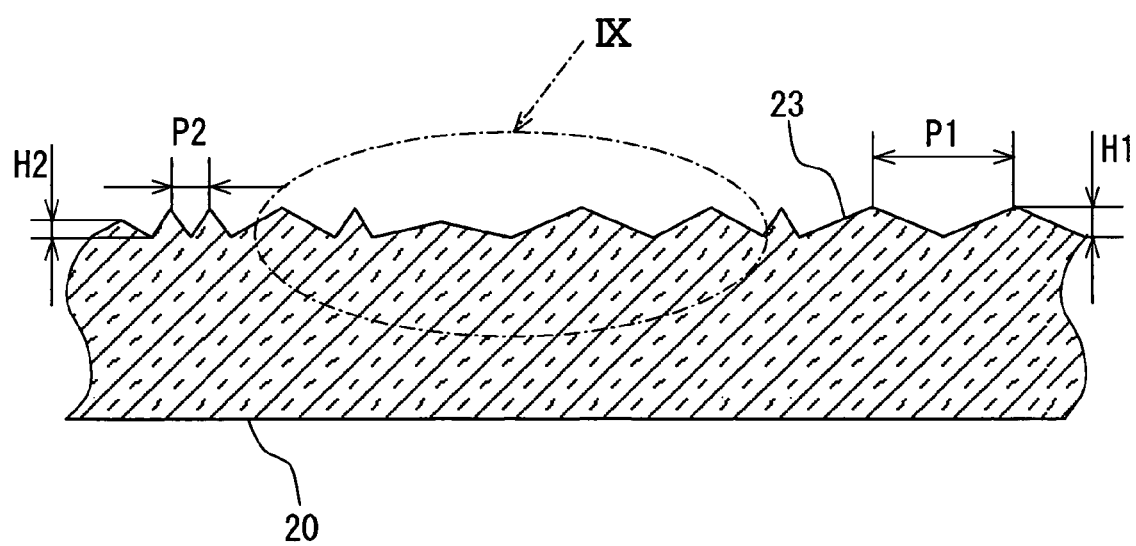
FIG. 8 is a partial, enlarged cross-sectional view of a base plate of the dial board according to a second example embodiment of the present invention.

Further, the ornamental line pattern 23 is formed such that the projections and grooves are arranged at random intervals and have variations in their heights. For example, as shown in FIG. 8. An interval P1 is larger than an interval P2. In FIG. 8, only the intervals P1 and P2 are shown for convenience of illustration. The projections can be formed at any random intervals. For example, the projections can be randomly formed with only two kinds of intervals (P1, P2). Alternatively, the projections can be randomly formed with more than two kind intervals (P1, P2, P3, . . . Pn).

Likewise, the projections are formed with random height in the direction perpendicular to the longitudinal direction of the ornamental line pattern 23. In FIG. 8, the projections has two heights (H1, H2). The height of the projections have variation more than two (H1, H2).

Since the ornamental line pattern 23 defined by the projections and grooves have the light transmissivity, a natural light (external light) is dispersed into a spectrum by a prism effect. Further, the projections and grooves are arranged at random intervals and have the variation in their heights. Therefore, light having the same color is directed in different directions. Accordingly, it is less likely that the intensity of the same color will increase.

Figure 9:
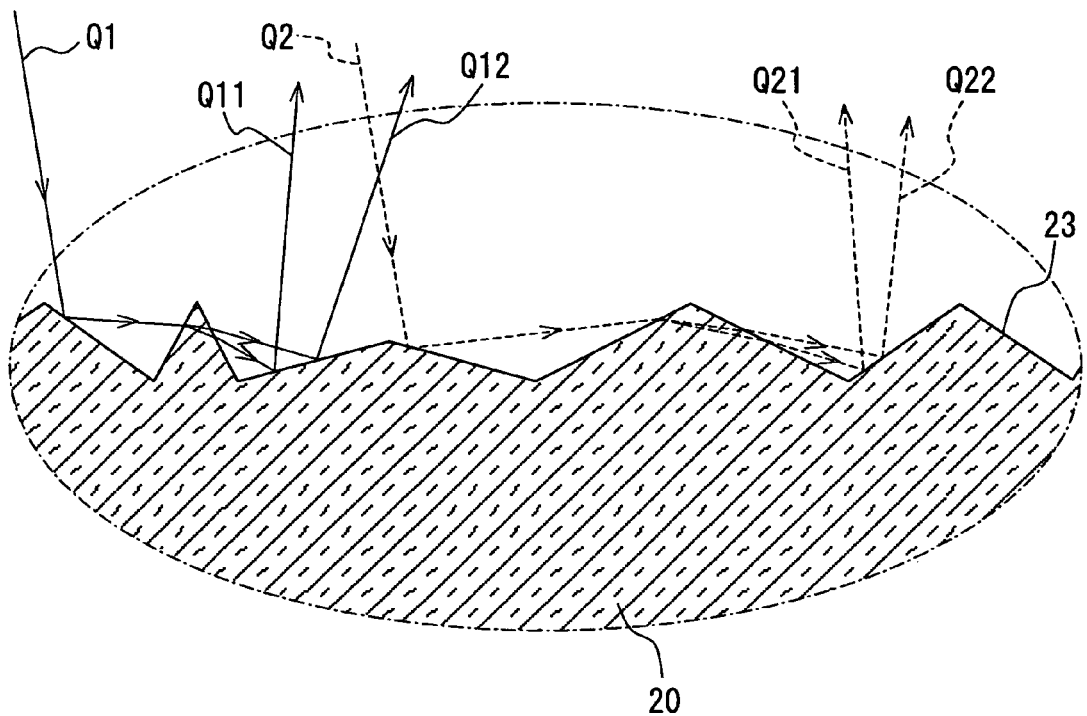
FIG. 9 is an enlarged cross-sectional view of a part of the base plate denoted by an arrow IX in FIG. 8.

For example, as shown in FIG. 9, the incident light shown by an optical path Q1 is dispersed between optical paths Q11, Q12 by the prism effect of the projections and grooves. In FIG. 9, only the optical paths Q11 and Q12 are illustrated for convenience of illustration. Between the optical path Q11 and the optical path Q12, different colors continuously exist.

Likewise, the incident light shown by an optical path Q2 is dispersed into lights having different colors between optical paths Q21 and Q22. The light on the optical path Q11 has the same color as that of the light on the optical path Q21. Similarly, the light on the optical path Q12 has the same color as that of the light on the optical path Q22.

In the second example embodiment, the intervals and the height of the projections and grooves have random size variations. Thus, the light on the optical path Q11 and the light on the optical path Q21 direct in different directions to each other. Accordingly, it is less likely that the intensity of light having the same color will increase. Likewise, the light on the optical path Q12 and the light on the optical path Q22 direct in different directions to each other. Further, the lights between the optical path Q11 and Q12 direct in different directions from those of the lights between the optical path Q21 and Q22. Accordingly, it is less likely that the intensity of the same colored lights will increase.

Figure 10:
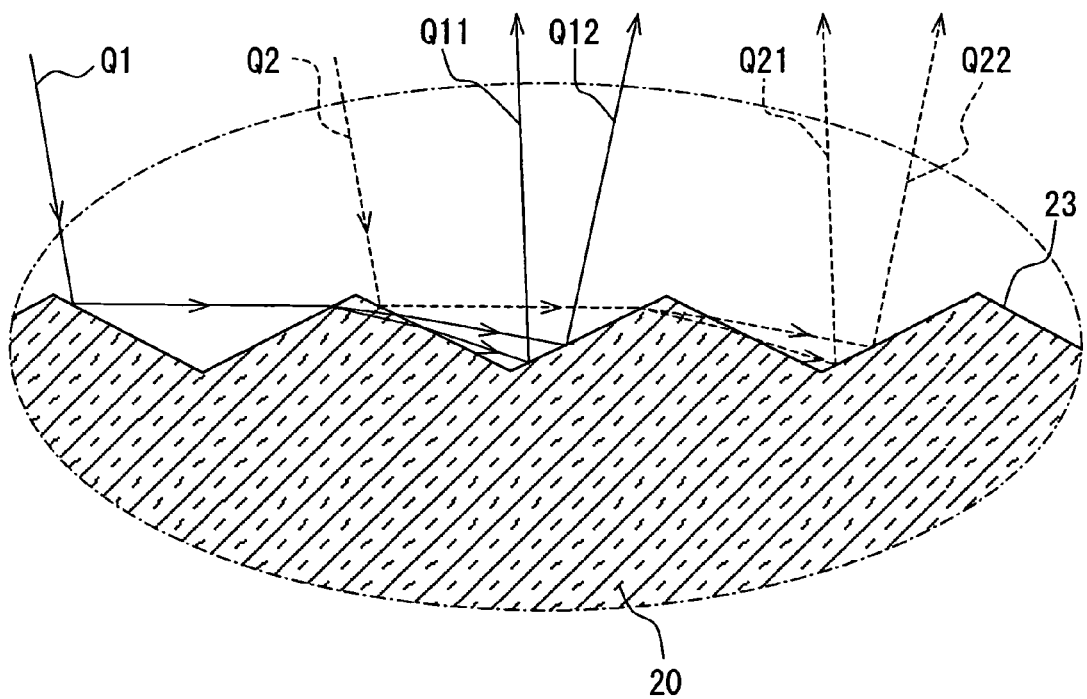
FIG. 10 is an enlarged cross-sectional view of a base plate as a comparison example to the base plate shown in FIG. 8.

The second example embodiment will be compared to a comparison example shown in FIG. 10. In FIG. 10, the ornamental line pattern 23 defined by the projections and grooves have light transmissivity. The projections are formed at equal intervals and have the equal height.

In FIG. 10, the light on the optical path Q1 is dispersed into a spectrum between an optical path Q11 and an optical path Q12 by the prism effect. Likewise, the light on the optical path Q2 is dispersed into a spectrum between an optical path Q21 and an optical path Q22 by the prism effect.

However, the light on the optical path Q11 and the light on the optical path Q21 direct in the same direction. Accordingly, the intensity of the same colored lights increases. Likewise, the light on the optical path Q12 and the light on the optical path Q22 direct in the same direction. Further, lights between the optical path Q11 and the optical path Q12 direct in the same direction as lights between the optical path Q21 and the optical path Q22. Accordingly, the intensity of the same colored lights increases.

Figure 11:
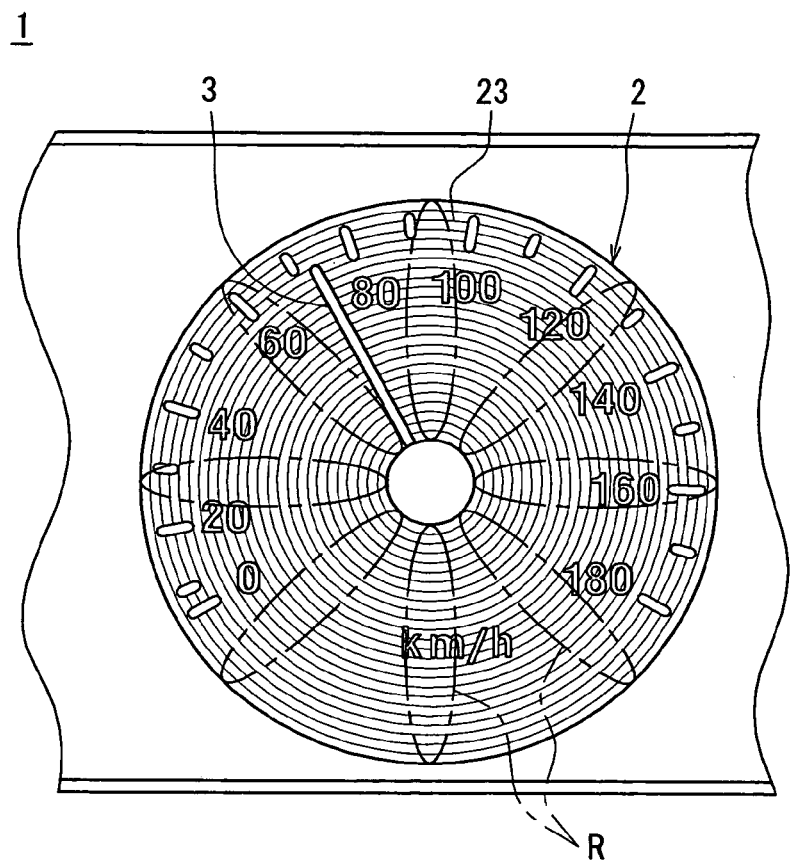
FIG. 11 is a plan view of a dial board having the base plate shown in FIG. 10.

As a result, uneven brightness, which looks like a rainbow pattern, occurs, as shown in FIG. 11. Namely, rainbow belts, which radially extend from the rotation axis of the pointer 3, occur in regions R of FIG. 11. Accordingly, the desired metal-like appearance is likely to be deteriorated.

On the contrary, in the second example embodiment shown in FIG. 9, it is less likely that the intensity of the same colored light will increase. Namely, the lights on the optical paths Q11 through Q22 randomly interfere, producing the natural light. Accordingly, it is less likely that uneven brightness will occur. As such, the desired metal-like appearance is provided.

In the second example embodiment shown in FIGS. 8 and 9, both of the intervals and the heights of the projections are randomly changed in the direction perpendicular to the longitudinal direction of the ornamental line pattern 23 (right and left direction in FIG. 8). However, it is not always necessary to randomly change both of the intervals and the heights. For example, one of the intervals and the heights can be randomly changed.

The intervals of the projections are preferably changed in a range equal to or more than ±50% with respect to the interval P as a reference. When the range of the change is larger, the occurrence of uneven brightness is more effectively reduced. For example, the intervals of the projections are varied in a range equal to or larger than 0.2±0.1 mm (i.e., 0.1 mm to 0.3 mm). Likewise, the heights of the projections are preferably changed in a range equal to or more than ±50% with respect to the height H as a reference.

Figure 12:
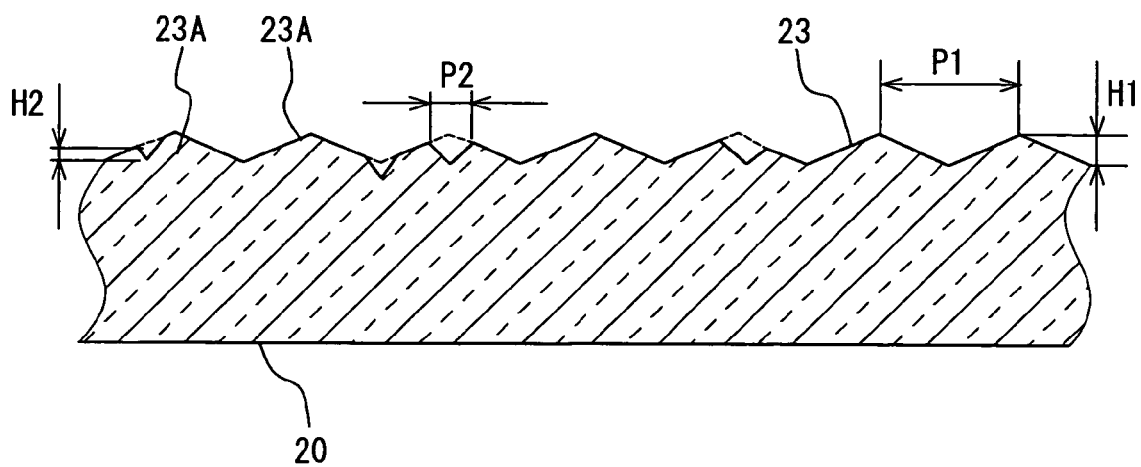
FIG. 12 is an enlarged partial cross-sectional view of a base plate as a modification of the base plate shown in FIG. 8.

In the second example embodiments, the ornamental line pattern 23 can be formed in manners similar to those of the first example embodiment. Alternatively, the ornamental line pattern 23 can be formed as follows. First, the ornamental line pattern 23 with the equal intervals P and the equal height H is formed in the base plate 20. Then, the surface of the base plate 20 is processed so that the intervals P and the height H are random. For example, the base plate 20 shown in FIG. 10 can be abraded by using an abrasive material so that the projections and grooves are formed as shown in FIG. 12. A portion denoted by dashed line corresponds to an abraded part. Accordingly, the apexes of the projections have random intervals and random heights.

Further, the line pattern having the random intervals and height are formed by a NC lathe processing (numerical control). Furthermore, the shape of the projections and grooves are not particularly limited. Similar to the first example embodiment, the projections and grooves of the ornamental line pattern 23 can have cross-sectional shapes such as a general semi-circular shape or a general rectangular shape, in addition to the general triangular cross-sectional shape.

As shown in FIG. 12, the projections and grooves can have different cross-sectional shapes 23A such as the rectangular shape and triangular shape in the single base plate 20.

In the above described embodiments, the base plate 20 is employed in the dial board 2 of the speed meter. However, the use of the base plate 20 is not limited to the speed meter. The base plate 20 can be employed to another measuring instrument such as a tachometer for showing a rotational speed of an engine, a water temperature gauge, a fuel gauge, and a voltmeter. Further, the use of the base plate 20 is not limited to the vehicle combination meter 1.

In the first example embodiment, the intervals P and the height H are calculated through the examination so that the glossiness ratio Gp/Gv of the base plate 20 is preferably in the range between 1.5 and 2.2, thereby providing the desired metal-like appearance. However, the range of the glossiness ratio Gp/Gv is not always limited to the above range because the metal-like appearance is based on the sense of sight and may differ depending on ages or distinction of sex. For example, the glossiness ratio Gp/Gv can be in a range between 1.3 and 2.2 or in a range between 1.5 and 2.5.

The example embodiments of the present invention are described above. However, the present invention is not limited to the above example embodiments, but may be implemented in other ways without departing from the spirit of the invention.

What is claimed is:

1. An indicating instrument comprising:
a panel including a base plate made of resin and having a surface, the surface having a line pattern with lines formed therein, the line pattern forming concentric circles, wherein
the line pattern is defined by projections and grooves,
each of the projections has a triangular cross-section in a cross-sectional plane defined perpendicular to an axis of one of the lines, wherein the triangular cross-section of each projection is defined by two inclined walls which extend along a respectively associated line in said line pattern, both said walls being inclined relative to a direction perpendicular to the surface of the base plate,
the grooves are defined between adjacent projections, the projections being arranged with an interval in a range between 0.1 mm and 0.3 mm between adjacent projections and each of the projections having a dimension that is in a range between 10 μm and 20 μm in a direction perpendicular to the surface, the projections and grooves are formed such that the surface has a glossiness ratio Gp/Gv in a range between 1.5 and 2.2, Gp is a glossiness having a value equal to or lower than 40 measured in a direction parallel to an axis of at least one line, Gv is a glossiness having a value equal to or lower than 40 measured in a direction perpendicular to an axis of at least one line, and each of glossiness Gv and glossiness Gp is determined by reflectance of light when an angle of incidence and an angle of reflection relative to the surface are 60°, thereby forming the line pattern to provide a metallic appearance on the surface of the base plate, wherein the panel is provided with scales formed on the surface of the base plate to cover a part of the line pattern, and wherein the indicating instrument further comprises:
a pointer for pointing to the scales, the pointer being disposed rotatable along the surface of the panel about a center of the concentric circles.

2. The indicating instrument according to claim 1, wherein:
the base plate having said line pattern has light transmissivity,
the projections are arranged at intervals and each of the projections has a dimension in a direction perpendicular to the surface, and
at least one of the intervals and the dimension have size variations.

3. The indicating instrument according to claim 2, wherein:
the intervals of the projections has at least one reference interval, and
the intervals are different in a range equal to or greater than ±50% with respect to the reference interval.

4. The indicating instrument according to claim 3, wherein the intervals are randomly varied.

5. The indicating instrument according to claim 2, wherein:
the projections have at least one reference dimension, and
the dimensions are different in a range equal to or greater than ±50% with respect to the reference dimension.

6. The indicating instrument according to claim 5, wherein the dimensions are randomly varied.

7. The indicating instrument according to claim 1, wherein:
at least one groove between adjacent projections has a flat planar surface in a cross-sectional plane that is perpendicular to an axis of at least one line.

8. The indicating instrument according to claim 1, wherein:
the line pattern is formed by one of a die transferring using a precision die with projections and grooves, a printing using a printing plate, a hot stamping using a transferring film and a precision die, and a laminate processing.

9. The indicating instrument according to claim 1, wherein:
the scales are formed with flat tops and rounded corners.

10. The indicating instrument according to claim 9, wherein:
the panel is provided with letters and numbers associated with the scales.

11. The indicating instrument according to claim 1, wherein:
the line pattern is defined by sloped walls with respect to a plane of the base plate by forming the grooves which do not have flat bottom walls and have generally V-shaped cross-sections.

12. An indicating instrument comprising:
a panel including a base plate made of resin and having a light transmissive line pattern of concentric circles in the base plate surface of projections triangularly shaped in cross-section and grooves between adjacent ones of said projections, wherein the triangular cross-section of each projection is defined by two inclined walls which extend along a respectively associated line in said line pattern, both said walls being inclined relative to a direction perpendicular to the surface of the base plate, such that the surface has a glossiness ratio Gp/Gv in a range between 1.5 and 2.2, wherein Gp is a glossiness value measured in a direction parallel to an axis of at least one line, Gv is a glossiness value measured in a direction perpendicular to an axis of at least one line, and each of glossiness Gv and glossiness Gp values is determined by reflectance of light when an angle of incidence and an angle of reflection relative to the surface are each 60°, thereby forming the line pattern to provide a metallic appearance on the surface of the base plate, wherein the panel is provided with scales formed on the surface of the base plate to cover a part of the line pattern and a rotatable pointer that points to said scales, and is disposed rotatable along the surface of the panel about a center of the concentric circles and wherein the indicating instrument further comprises:
said projections being arranged at intervals and having a dimension in a direction perpendicular to the surface, at least one of said intervals and said dimension being of varied size;
said intervals including at least one reference interval and at least one reference dimension, the intervals being different from each other in a range equal to or greater than ±50% with respect to the reference interval and the dimensions being different from each other in a range equal to or greater than ±50% with respect to the reference dimension; and
each of the glossiness Gv and glossiness Gp values being equal to or lower than 40.

13. An indicating instrument comprising:
a panel including a base plate made of resin and having a light transmissive line pattern of concentric circles in its surface of projections triangularly shaped in cross-section, said projections being disposed at spaced intervals and having respectively associated heights and said base plate having grooves between adjacent ones of said projections, wherein the triangular cross-section of each projection is defined by two inclined walls which extend along a respectively associated line in said line pattern, both said walls being inclined relative to a direction perpendicular to the surface of the base plate, such that the surface has a glossiness ratio Gp/Gv in a range between 1.5 and 2.2, wherein Gp is a glossiness value equal to or less than 40 measured in a direction parallel to an axis of at least one line, Gv is a glossiness value equal to or less than 40 measured in a direction perpendicular to an axis of at least one line, and each of glossiness Gv and glossiness Gp values is determined by reflectance of light when an angle of incidence and an angle of reflection relative to the surface are each 60°, thereby forming the line pattern to provide a metallic appearance on the surface of the base plate, wherein the panel is provided with scales formed on the surface of the base plate to cover a part of the line pattern and a rotatable pointer that points to said scales, and is disposed rotatable along the surface of the panel about a center of the concentric circles and wherein the indicating instrument further comprises:
at least one of (a) the intervals and (b) the heights of the projections being randomly changed in a direction perpendicular to a longitudinal direction of the line pattern.

14. An indicating instrument comprising:
a panel including a base plate made of resin and having a light transmissive line pattern of concentric circles in its surface of projections triangularly shaped in cross-section and grooves between adjacent ones of said projections, wherein the triangular cross-section of each projection is defined by two inclined wails which extend along a respectively associated line in said line pattern, both said walls being inclined relative to a direction perpendicular to the surface of the base plate, such that the surface has a glossiness ratio Gp/Gv in a range between 1.5 and 2.2, wherein Gp is a glossiness value equal to or less than 40 measured in a direction parallel to an axis of at least one line, Gv is a glossiness value equal to or less than 40 measured in a direction perpendicular to an axis of at least one line, and each of glossiness Gv and glossiness Gp values is determined by reflectance of light when an angle of incidence and an angle of reflection relative to the surface are each 60°, thereby forming the line pattern to provide a metallic appearance on the surface of the base plate, wherein the panel is provided with scales formed on the surface of the base plate to cover a part of the line pattern and a rotatable pointer that points to said scales, and is disposed rotatable along the surface of the panel about a center of the concentric circles and wherein the indicating instrument further comprises:
the projections and grooves having differing wall inclination angles across the base plate surface.

\* \* \* \* \*